(12) United States Patent
Horton

(10) Patent No.: US 7,272,905 B1
(45) Date of Patent: Sep. 25, 2007

(54) TURKEY DECOY SYSTEM

(76) Inventor: Albert E. Horton, 120 S. Dixie Dr., Frostproof, FL (US) 33843

( * ) Notice: Subject to any disclaimer, the term of this patent is extended or adjusted under 35 U.S.C. 154(b) by 0 days.

(21) Appl. No.: 11/542,426

(22) Filed: Oct. 3, 2006

(51) Int. Cl.
*A01M 31/06* (2006.01)

(52) U.S. Cl. ........................................................... 43/2

(58) Field of Classification Search .................. 43/2, 43/3
See application file for complete search history.

(56) References Cited

U.S. PATENT DOCUMENTS

| | | | | | |
|---|---|---|---|---|---|
| 2,480,390 | A | * | 8/1949 | Thompson | 43/3 |
| 2,691,233 | A | * | 10/1954 | Richardson | 43/3 |
| 2,849,823 | A | * | 9/1958 | Miller | 43/3 |
| 3,059,368 | A | * | 10/1962 | Wortman | 43/3 |
| 3,350,808 | A | * | 11/1967 | Mitchell | 43/3 |
| 3,916,553 | A | * | 11/1975 | Lynch et al. | 43/3 |
| 4,422,257 | A | * | 12/1983 | McCrory | 43/3 |
| 4,965,953 | A | * | 10/1990 | McKinney | 43/2 |
| 5,036,614 | A | * | 8/1991 | Jackson | 43/3 |
| 5,168,649 | A | * | 12/1992 | Wright | 43/2 |
| 5,233,780 | A | * | 8/1993 | Overholt | 43/2 |
| 5,274,942 | A | * | 1/1994 | Lanius | 43/2 |
| 5,289,654 | A | * | 3/1994 | Denny et al. | 43/2 |
| 5,459,958 | A | * | 10/1995 | Reinke | 43/2 |
| 5,636,466 | A | * | 6/1997 | Davis | 43/3 |
| 5,832,649 | A | * | 11/1998 | Kilgore | 43/2 |
| 5,926,990 | A | * | 7/1999 | Okimoto | 43/2 |
| 6,070,356 | A | * | 6/2000 | Brint et al. | 43/2 |
| 6,212,816 | B1 | * | 4/2001 | Babbitt et al. | 43/3 |
| 6,408,558 | B1 | * | 6/2002 | Cornell et al. | 43/2 |
| 6,532,693 | B2 | * | 3/2003 | Sides | 43/2 |
| 6,553,709 | B1 | * | 4/2003 | Owen | 43/3 |
| 6,574,902 | B1 | * | 6/2003 | Conger | 43/2 |
| 6,574,904 | B1 | * | 6/2003 | Fencel et al. | 43/3 |
| 6,591,539 | B2 | * | 7/2003 | Cosciani | 43/2 |
| 6,643,971 | B2 | * | 11/2003 | Daniels | 43/3 |
| 6,658,782 | B2 | * | 12/2003 | Brint | 43/2 |
| 6,684,552 | B1 | * | 2/2004 | Anders, III | 43/3 |
| 6,708,440 | B2 | * | 3/2004 | Summers et al. | 43/2 |
| 6,775,943 | B2 | * | 8/2004 | Loughman | 43/2 |
| 6,834,458 | B1 | * | 12/2004 | Hand et al. | 43/3 |
| 6,901,693 | B1 | * | 6/2005 | Crowe | 43/2 |
| 6,907,688 | B2 | * | 6/2005 | Brint | 43/2 |
| 6,957,509 | B2 | * | 10/2005 | Wright | 43/3 |
| 7,082,710 | B1 | * | 8/2006 | Jorgenson | 43/2 |
| 2002/0162268 | A1 | * | 11/2002 | Fulcher | 43/3 |
| 2002/0178639 | A1 | * | 12/2002 | Daniels | 43/3 |
| 2003/0196367 | A1 | * | 10/2003 | Powell | 43/3 |
| 2004/0025399 | A1 | * | 2/2004 | Donnigan et al. | 43/2 |
| 2004/0194365 | A1 | * | 10/2004 | Summers et al. | 43/2 |
| 2005/0150149 | A1 | * | 7/2005 | Highby et al. | 43/3 |

(Continued)

FOREIGN PATENT DOCUMENTS

EP        1179296 A2 *   2/2001

(Continued)

*Primary Examiner*—Darren W. Ark
(74) *Attorney, Agent, or Firm*—Edward P. Dutkeiwicz

(57) ABSTRACT

A first turkey decoy and a second turkey decoy are provided. A motion imparting assembly includes a first motor. The first motor reciprocates the first turkey decoy between up and down positions. The motion imparting assembly also includes a second motor. The second motor reciprocates the first and second turkey decoy between left and right positions.

6 Claims, 4 Drawing Sheets

U.S. PATENT DOCUMENTS

2005/0160654 A1 * 7/2005 Cosciani .......................... 43/2
2005/0204604 A1 * 9/2005 Noles et al. ...................... 43/2
2006/0143968 A1 * 7/2006 Brint et al. ...................... 43/2
2007/0039227 A1 * 2/2007 Highby et al. ................... 43/2

FOREIGN PATENT DOCUMENTS

| | | | |
|---|---|---|---|
| EP | 1279333 A2 * | 1/2003 |
| FR | 2873265 A1 * | 1/2006 |
| GB | 2295953 A * | 6/1996 |
| GB | 2412560 A * | 10/2005 |
| WO | WO-03/059058 A1 * | 7/2003 |

* cited by examiner

US 7,272,905 B1

TURKEY DECOY SYSTEM

BACKGROUND OF THE INVENTION

1. Field of the Invention

The present invention relates to a turkey decoy system and more particularly pertains to attracting wild turkeys through a first turkey decoy movable between an up and down position and a second turkey decoy movable between a left and right position.

2. Description of the Prior Art

The use of decoys of known designs and configurations is known in the prior art. More specifically, decoys of known designs and configurations previously devised and utilized for the purpose of attracting animals through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,168,649 issued Dec. 8, 1992 to Wright relates to a Turkey Decoy. U.S. Pat. No. 5,459,958 issued Oct. 24, 1995 to Reinke relates to a Decoy Mechanism for Adaptation to Create Vertical Movement and Coincident Vocalization. U.S. Pat. No. 6,212,816 issued Apr. 10, 2001 to Babbitt relates to a Remote Controlled Animal Decoy. Lastly, U.S. Pat. No. 6,775,943 issued Aug. 17, 2004 to Loughman relates to a Manually Movable Decoy Device.

While these devices fulfill their respective, particular objectives and requirements, the aforementioned patents do not describe a turkey decoy system that allows for attracting wild turkeys through a first turkey decoy movable between an up and down position and a second turkey decoy movable between a left and right position.

In this respect, the turkey decoy system according to the present invention substantially departs from the conventional concepts and designs of the prior art, and in doing so provides an apparatus primarily developed for the purpose of attracting wild turkeys through a first turkey decoy movable between an up and down position and a second turkey decoy movable between a left and right position.

Therefore, it can be appreciated that there exists a continuing need for a new and improved turkey decoy system which can be used for attracting wild turkeys through a first turkey decoy movable between an up and down position and a second turkey decoy movable between a left and right position. In this regard, the present invention substantially fulfills this need.

SUMMARY OF THE INVENTION

In view of the foregoing disadvantages inherent in the known types of decoys of known designs and configurations now present in the prior art, the present invention provides an improved turkey decoy system. As such, the general purpose of the present invention, which will be described subsequently in greater detail, is to provide a new and improved turkey decoy system and method which has all the advantages of the prior art and none of the disadvantages.

To attain this, the present invention essentially comprises a turkey decoy system. First provided is a first turkey decoy. The first turkey decoy has a periphery. The periphery is shaped to simulate a first turkey. In this manner wild turkeys are attracted. The first turkey decoy has a short vertical support rod. The short vertical support rod has an upper end and a lower end. The short vertical support rod is rigidly coupled to the first turkey decoy.

A second turkey decoy is provided. The second turkey decoy has a periphery. The periphery is shaped to simulate a second turkey. In this manner wild turkeys are attracted. The second turkey decoy has a long vertical support rod. The long vertical support rod has an upper end and a lower end. The long vertical support rod is rigidly coupled to the second turkey decoy. The long vertical support rod is between about two and three times the length of the short vertical support rod. In this manner the second turkey decoy is maintained at an elevation above the first turkey decoy at all times during operation and use.

Provided next is a motion imparting assembly. The motion imparting assembly includes a base. The base is positionable upon a horizontal support surface. The motion imparting assembly includes a first motor. The first motor has a horizontal drive shaft. The horizontal drive shaft is adapted to rotate about a horizontal axis. The motion imparting assembly has a first linkage. The first linkage has an input disk. The input disk has a center. The center is rotatably coupled to the horizontal drive shaft. In this manner a fixed position is maintained during rotation of the horizontal drive shaft. The first linkage has an output disk. The output disk has a stub. The stub is coupled to the short vertical support rod adjacent to its lower end for oscillation therewith.

The motion imparting assembly also has a primary strut. The primary strut has a lower extent. The lower extent is secured for oscillation with the rotation of the horizontal drive shaft. The primary strut has an upper extent. The output disk and short vertical rod are adapted to rotate. The motion imparting assembly also has a secondary strut. The secondary strut has a lower extent. The lower extent is rotatably secured to a input disk for oscillation. The secondary strut has an upper extent. The upper extent is rotatably secured to the output disk beneath the stub. In this manner activation of the first motor oscillates the primary and secondary struts to raise and lower the short vertical rod and first turkey decoy. The secondary strut translates axially to maintain the short vertical rod in a vertical orientation at all times. The resultant motion makes the first turkey appear to be "squatting" a motion that is associated with a desire for a female turkey to breed.

The motion imparting assembly also includes a second motor. The second motor has a vertical shaft. The vertical shaft is adapted to rotate about a vertical axis. The motion imparting assembly has a drive wheel. The drive wheel is rotatably secured to the base for rotation about a vertical axis offset from the vertical shaft. A drive belt with an idler pulley are provided between the vertical shaft and the drive wheel. The secondary motor has a connector linkage. The connector linkage has an inner end. The inner end is secured to the drive wheel. The connector linkage has a remote end. The long vertical rod is secured at a lower end to the remote end of the linkage. The connector linkage has a bend of between 75 and 105 degrees between its ends. In this manner activation of the second motor will rotate the drive wheel with the linkage and the long vertical rod to reciprocate the long vertical rod and the first and second turkey decoy between a left position and a right position. This maneuver causes the two turkeys to rotate through an arc of travel. This allows the user to adjust the position of the pair of turkeys to provide the best silhouette for competing and approaching turkeys. The positioning of the second turkey represents a male standing guard over its breeding mate.

Provided last is a controller. The controller has an on/off button. The on/off button electrically energizes the motors from a remote location with two separate switches. A first switch is provided. The first switch activates the movement of first motor and the first turkey decoy between an up position and a down position. A second switch is provided. The second switch activates the movement of second motor and the first and second turkey decoys between a left position and a right position to thereby attract wild turkeys.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved turkey decoy system which has all of the advantages of the prior art decoys of known designs and configurations and none of the disadvantages.

It is another object of the present invention to provide a new and improved turkey decoy system which may be easily and efficiently manufactured and marketed.

It is further object of the present invention to provide a new and improved turkey decoy system which is of durable and reliable constructions.

An even further object of the present invention is to provide a new and improved turkey decoy system which is susceptible of a low cost of manufacture with regard to both materials and labor, and which accordingly is then susceptible of low prices of sale to the consuming public, thereby making such turkey decoy system economically available to the buying public.

Even still another object of the present invention is to provide a turkey decoy system for attracting wild turkeys through a first turkey decoy movable between an up and down position and a second turkey decoy movable between a left and right position.

Lastly, it is an object of the present invention to provide a new and improved turkey decoy system. A first turkey decoy and a second turkey decoy are provided. A motion imparting assembly includes a first motor. The first motor reciprocates the first turkey decoy between up and down positions. The motion imparting assembly also includes a second motor. The second motor reciprocates the first and second turkey decoys between left and right positions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
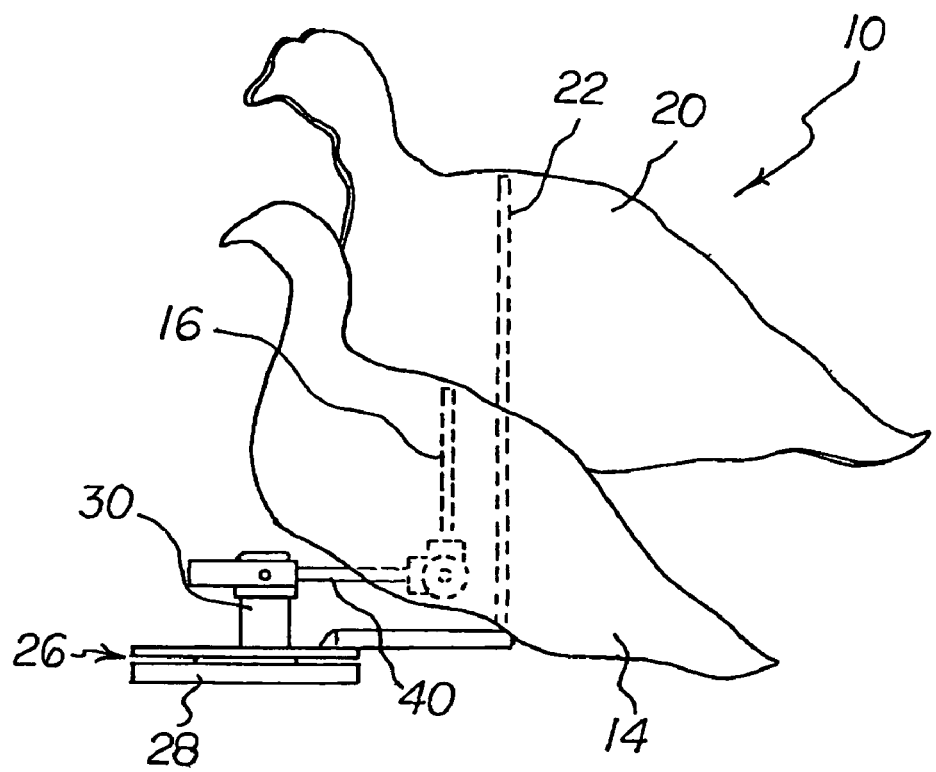
FIG. 1 is a side elevational view of a turkey decoy system featuring both a first turkey decoy and a second turkey decoy and constructed in accordance with the principles of the present invention.
Figure 2:
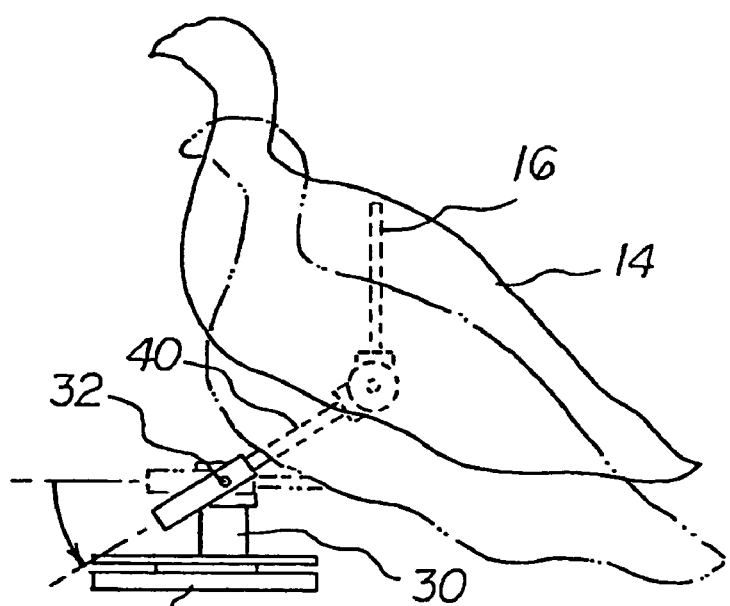
FIG. 2 is a side elevational view of the first turkey decoy in an up position and, shown in broken lines, a down position.
Figure 3:
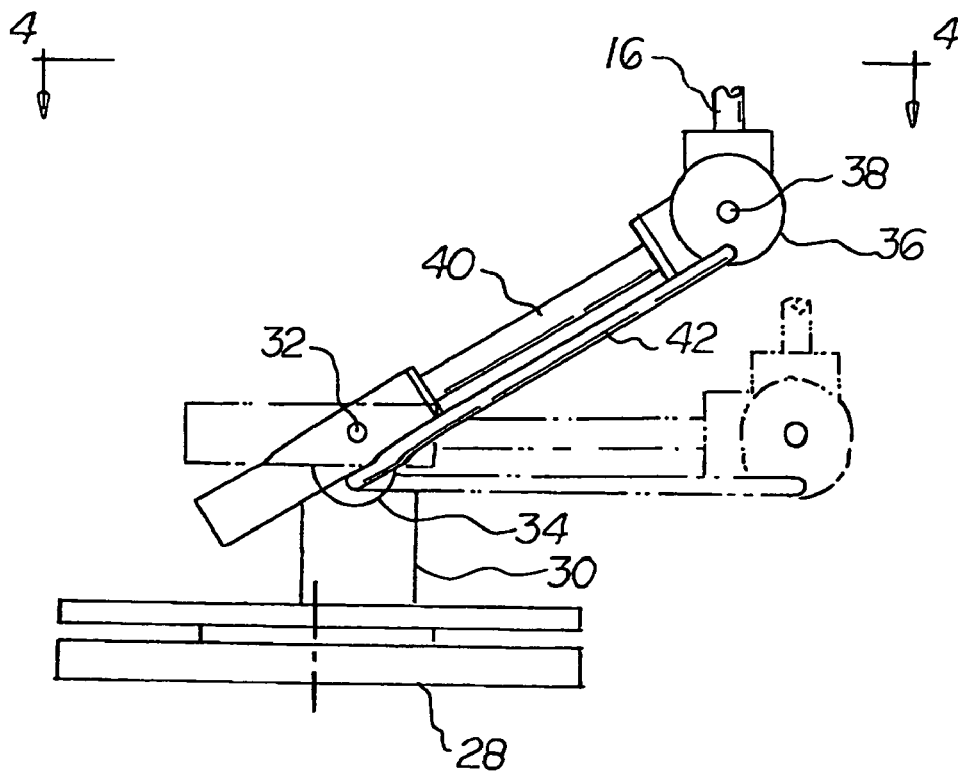
FIG. 3 is an enlarger side elevational view of the motion imparting mechanisms for the first turkey decoy as shown in FIGS. 1 and 2.
Figure 4:
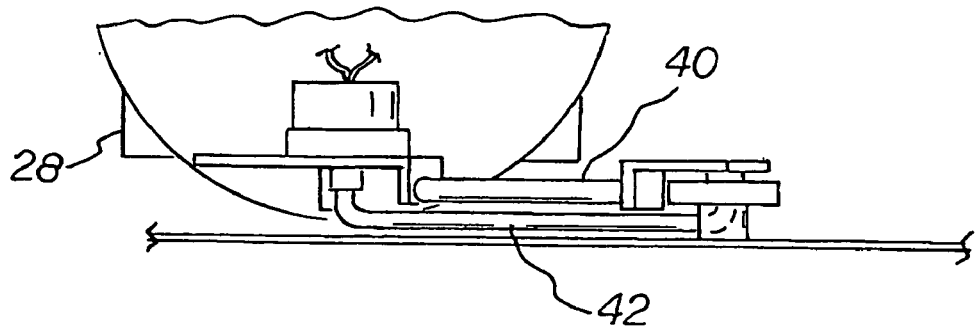
FIG. 4 is an enlarger plan view of the motion imparting mechanisms taken along line 4-4 of FIG. 3.
Figure 5:
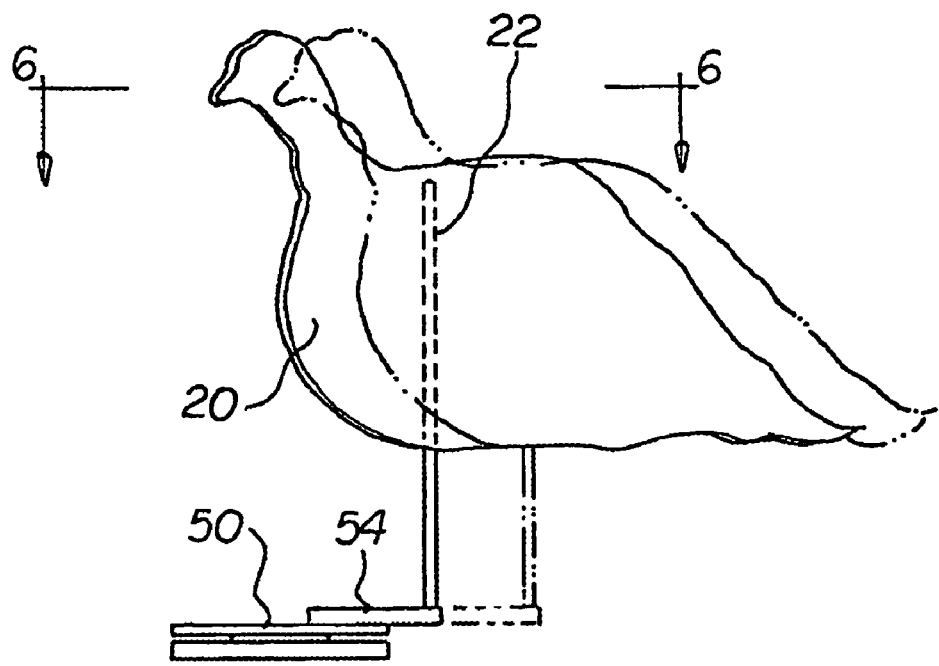
FIG. 5 is a side elevational view of the second turkey decoy shown in FIG. 1 in a left position and, in broken lines, a right position.
Figure 6:
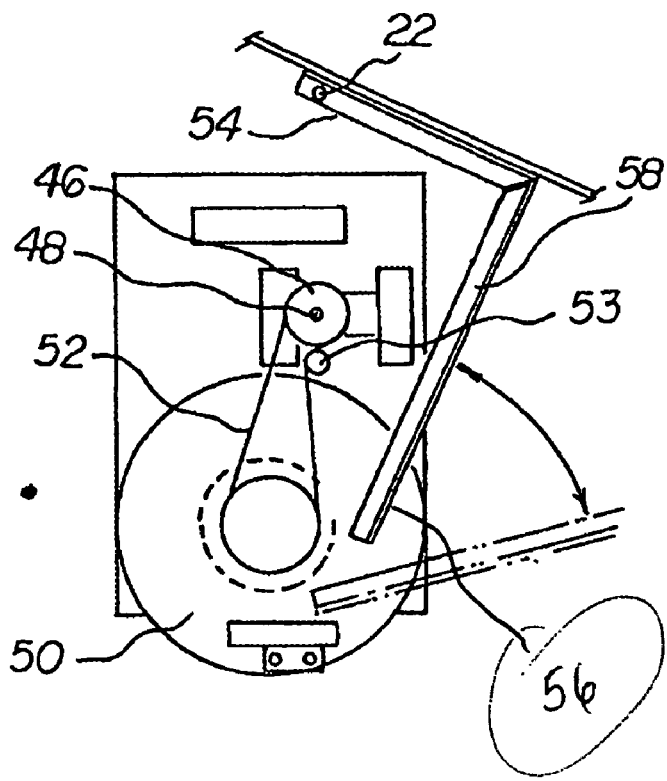
FIG. 6 is an enlarger plan view of the motion imparting mechanisms taken along line 6-6 of FIG. 5.
Figure 7:
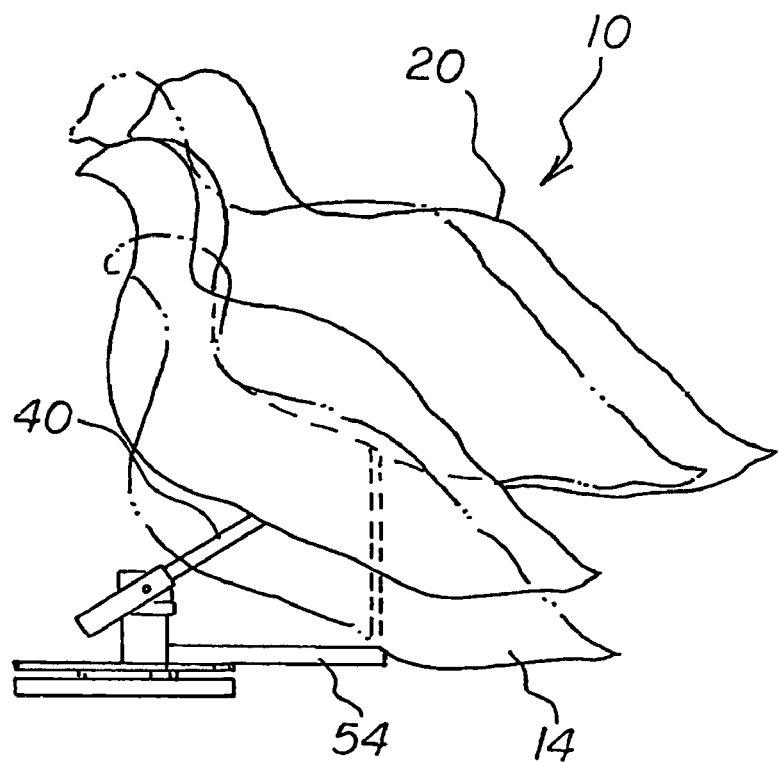
FIG. 7 is a side elevational view similar to FIG. 1 but illustrating the first turkey decoy in an up position and, in broken lines, a down position and illustrating the second turkey decoy shown in FIG. 1 in a right position and, in broken lines, a left position.
Figure 8:
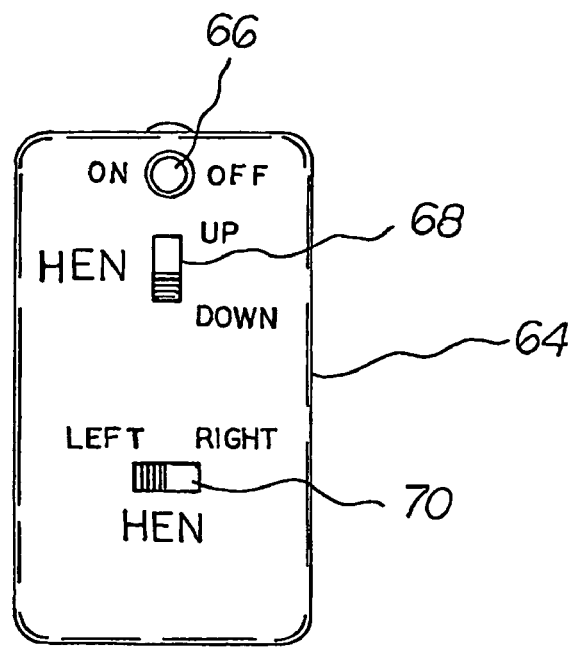
FIG. 8 is a plan view of the remote control assembly for operating the system of the prior Figures.

With reference now to the drawings, and in particular to FIG. 1 thereof, the preferred embodiment of the new and improved turkey decoy system embodying the principles and concepts of the present invention and generally designated by the reference numeral 10 will be described.

The present invention, the turkey decoy system 10 is comprised of a plurality of components. Such components in their broadest context include a first turkey decoy, a second turkey decoy and a motion imparting assembly. Such components are individually configured and correlated with respect to each other so as to attain the desired objective.

First provided is a first turkey decoy 14. The first turkey decoy has a periphery. The periphery is shaped to simulate a first turkey. In this manner wild turkeys are attracted. The first turkey decoy has a short vertical support rod 16. The short vertical support rod has an upper end and a lower end. The short vertical support rod is rigidly coupled to the first turkey decoy.

A second turkey decoy 20 is provided. The second turkey decoy has a periphery. The periphery is shaped to simulate a second turkey. In this manner wild turkeys are attracted. The second turkey decoy has a long vertical support rod 22. The long vertical support rod has an upper end and a lower end. The long vertical support rod is rigidly coupled to the second turkey decoy. The long vertical support rod is between about two and three times the length of the short vertical support rod. In this manner the second turkey decoy is maintained at an elevation above the first turkey decoy at all times during operation and use.

The first turkey of the primary embodiment is shown as a female turkey, or hen. The second turkey of the primary embodiment is shown as a male turkey, or jake. It should be understood, however, that the turkey decoys could be formed to represent either sex.

Provided next is a motion imparting assembly 26. The motion imparting assembly includes a base 28. The base is positionable upon a horizontal support surface. The motion imparting assembly includes a first motor 30. The first motor has a horizontal drive shaft 32. The horizontal drive shaft is adapted to rotate about a horizontal axis. The first motor has a first linkage. The first linkage has an input disk 34. The input disk has a center. The center is rotatably coupled to the horizontal drive shaft. In this manner a fixed position is maintained during rotation of the horizontal drive shaft. The first linkage has an output disk 36. The output disk has a stub 38. The stub is coupled to the short vertical support rod adjacent to its lower end for oscillation therewith.

The motion imparting assembly also has a primary strut 40. The primary strut has a lower extent with an L-shaped component formed with an aperture for receiving the drive shaft. The lower extent is thus secured for oscillation with the rotation of the horizontal drive shaft. The primary strut has an upper extent with an L-shaped component formed with an aperture for receiving the stub. The output disk and short vertical rod are thus adapted to rotate. The motion imparting assembly also has a secondary strut 42. The secondary strut has a lower extent. The lower extent is rotatably secured to the input disk 34 for oscillation. The secondary strut has an upper extent. The upper extent is rotatably secured to the output disk beneath the stub. In this manner activation of the first motor oscillates the primary and secondary struts to raise and lower the short vertical rod and first turkey decoy. The secondary strut translates axially to maintain the short vertical rod in a vertical orientation at all times. The squatting, or sitting, decoy moves in an arc having a radius of between about 3 inches and 25 inches.

The motion imparting assembly also includes a second motor 46. The second motor has a vertical shaft 48. The vertical shaft is adapted to rotate about a vertical axis. The secondary motor has a drive wheel 50. The drive wheel is rotatably secured to the base for rotation about a vertical axis offset from the vertical drive shaft. The secondary motor has a drive belt 52 and an idler pulley 53 between the vertical shaft and the drive wheel. The drive belt couples the vertical drive shaft with the drive wheel. The secondary motor has a connector linkage 54. The connector linkage has an inner end 56. The inner end is secured to the drive wheel. The connector linkage has a remote end 58. The long vertical rod is secured at a lower end to the remote end of the linkage The connector linkage has a bend of between 75 and 105 degrees between its ends. In this manner activation of the second motor will rotate the drive wheel with the linkage and the long vertical rod to reciprocate the long vertical rod and second turkey decoy between a left position and a right position.

Provided last is a controller 64. The controller has an on/off button 66. The on/off button electrically energizes the motors from a remote location with two separate switches. A first switch 68 is provided. The first switch activates the movement of first motor and the first turkey decoy between an up position and a down position. A second switch 70 is provided. The second switch activates the movement of second motor and the first and second turkey decoys between a left position and a right position to thereby attract wild turkeys. In the preferred embodiment the second turkey decoy, or jake, is located so as to move in an arc of between about 15 inches and 30 inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turkey decoy system comprising:
    a first turkey decoy having a short vertical support rod with an upper end and a lower end rigidly coupled to the first turkey decoy; and
    a motion imparting assembly including a base positionable upon a horizontal support surface, the motion imparting assembly including a first motor to reciprocate the first turkey decoy between up and down positions, wherein the motion imparting assembly and first motor further including a rotatable drive shaft and a first linkage having an input disk with a center rotatable coupled to the rotatable drive shaft for maintaining its fixed position during rotation of the rotatable drive shaft and an output disk with a stub coupled to the short vertical support rod adjacent to its lower end for oscillation therewith, the motion imparting assembly also having a primary strut with a lower extent secured for oscillation with the rotation of the rotatable drive shaft and an upper extent about which the output disk and first turkey decoy are adapted to rotate, the motion imparting assembly also having a secondary strut with a lower extent rotatable secured to the input disk for oscillation and an upper extent rotatable secured to the output disk beneath the stub whereby activation of the first motor will oscillate the primary and secondary struts to raise and lower the first turkey decoy while the secondary strut translates axially to maintain the first turkey decoy in a vertical orientation at all times.

2. The system as set forth in claim 1 with the motion imparting assembly also including a second motor to rotate the first turkey decoy between left and right positions, with the system further comprising a second turkey decoy, the second turkey decoy having a long vertical support rod with an upper end and a lower end rigidly coupled to the second turkey decoy.

3. The system as set forth in claim 1 wherein a second turkey decoy is located alongside the first turkey decoy.

4. The system as set forth in claim 2 wherein the motion imparting assembly and second motor includes a vertical drive shaft adapted to rotate about a vertical axis and a drive wheel rotatably secured to the base for rotation about a vertical axis offset from the vertical drive shaft with a drive belt coupling the vertical drive shaft with the drive wheel, a connector linkage having an inner end secured to the drive wheel and a remote end secured to the lower end of the long vertical support rod, whereby activation of the second motor will rotate the drive wheel with the linkage and the long vertical rod to reciprocate the first and second turkey decoys between a left position and a right position.

5. The system as set forth in claim 2 and further including a controller having an on/off button to electrically energize the motors from a remote location with two separate switches, a first switch to activate the movement of the first motor and the first turkey decoy between an up position and a down position and a second switch to activate the movement of the second motor and the first and second turkey decoys between a left position and a right position to thereby attract wild turkeys.

6. A turkey decoy system for attracting wild turkeys through a first turkey decoy movable between an up and down position and a second turkey decoy movable between a left and right position comprising, in combination:
 a first turkey decoy having a periphery shaped to simulate a first turkey for attracting wild turkeys, the first turkey decoy having a short vertical support rod with an upper end and a lower end rigidly coupled to the first turkey decoy;
 a second turkey decoy having a periphery shaped to simulate a second turkey for attracting wild turkeys, the second turkey decoy having a long vertical support rod with an upper end and a lower end rigidly coupled to the second turkey decoy, the long vertical support rod being between about two and three times the length of the short vertical support rod for maintaining the second turkey decoy at an elevation above the first turkey decoy at all times during operation and use;
 a motion imparting assembly including a base positionable upon a horizontal support surface, the motion imparting assembly including a first motor with a horizontal drive shaft adapted to rotate about a horizontal axis and a first linkage having an input disk with a center rotatably coupled to the horizontal drive shaft for maintaining its fixed position during rotation of the horizontal drive shaft and an output disk with a stub coupled to the short vertical support rod adjacent to its lower end for oscillation therewith, the motion imparting assembly also having a primary strut with a lower extent secured for oscillation with the rotation of the horizontal drive shaft and an upper extent about which the output disk and short vertical rod are adapted to rotate, the motion imparting assembly also having a secondary strut with a lower extent rotatably secured to the input disk for oscillation and an upper extent rotatably secured to the output disk beneath the stub whereby activation of the first motor will oscillate the primary and secondary struts to raise and lower the short vertical rod and first turkey decoy while the secondary strut translates axially to maintain the short vertical rod in a vertical orientation at all times;
 the motion imparting assembly also including a second motor with a vertical drive shaft adapted to rotate about a vertical axis and a drive wheel rotatably secured to the base for rotation about a vertical axis offset from the vertical drive shaft with a drive belt coupling the vertical drive shaft and the drive wheel with an idler pulley there between, a connector linkage having an inner end secured to the drive wheel and a remote end secured to the lower end of the long vertical rod, the connector linkage having a bend of between 75 and 105 degrees whereby activation of the second motor will rotate the drive wheel with the linkage and the long vertical rod to reciprocate the long vertical rod moving the first and second turkey decoys between a left position and a right position; and
 a controller having an on/off button to electrically energize the motors from a remote location with two separate switches, a first switch to activate the movement of the first motor and the first turkey decoy between an up position and a down position and a second switch to activate the movement of the second motor and the first and second turkey decoys between a left position and a right position to thereby attract wild turkeys.

* * * * *